(12) United States Patent
Yokoyama et al.

(10) Patent No.: US 6,329,791 B1
(45) Date of Patent: Dec. 11, 2001

(54) POWER SUPPLY SYSTEM AND CONTROL METHOD FOR THE SYSTEM

(75) Inventors: Hidenori Yokoyama; Nobuyuki Okabe, both of Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/708,710

(22) Filed: Nov. 9, 2000

(30) Foreign Application Priority Data

Nov. 11, 1999 (JP) .................................................. 11-320567

(51) Int. Cl.$^7$ ....................................................... H02J 7/00
(52) U.S. Cl. ............................................. 320/127; 320/128
(58) Field of Search ..................................... 320/127, 125, 320/140, 128, 106

(56) References Cited

U.S. PATENT DOCUMENTS 5,793,189 * 8/1998 Kawaguchi et al. ................. 320/125
5,798,629 * 8/1998 Terauchi ............................... 320/106

FOREIGN PATENT DOCUMENTS 04-351436  12/1992  (JP) .

* cited by examiner

Primary Examiner—Peter S. Wong
Assistant Examiner—Lawrence Luk
(74) Attorney, Agent, or Firm—Kenyon & Kenyon

(57) ABSTRACT

In a power supply system in which a load is connected to a battery, the battery is efficiently charged without degrading the characteristics of the load. When a load that deteriorates in characteristics if a voltage exceeding the rated voltage of the load is applied thereto is connected to the battery (during an on-state of the load), the battery is charged with the rated voltage even if there is a need to charge the battery with a charging voltage higher than the rated voltage. Alternatively, the battery may be charged for a predetermined time at a voltage above the rated voltage and then at or below the rated voltage, or the voltage seen by the load may be converted to a voltage at or below the rated voltage while the battery is being charged at a voltage above the rated voltage. When the load is off, the battery is charged with a voltage higher than the rated voltage.

10 Claims, 8 Drawing Sheets

POWER SUPPLY SYSTEM AND CONTROL METHOD FOR THE SYSTEM

INCORPORATION BY REFERENCE

The disclosure of Japanese Patent Application No. HEI 11-320567 filed on Nov. 11, 1999 including the specification, drawings and abstract is incorporated herein by reference in its entirety.

BACKGROUND OF THE INVENTION

1. Field of the Invention

The invention relates to a power supply system and control method for the system, more particularly, relates to the charging circuit for a battery connected to a load that changes in characteristics, such as the length of service life, brightness, etc., if a voltage exceeding a rated voltage is applied thereto, and control method for the charging circuit.

2. Description of the Related Art

It has been proposed that a battery for a vehicle be installed in a trunk room instead of an engine room. Installation of a battery in a trunk room makes it possible to dispose the battery apart from the engine. However, the trunk is apt to be affected by external temperature. That is, if the external temperature decreases, the battery temperature also decreases. Therefore, a measure for temperature changes is needed. In general, it is effective to change the charging voltage of a battery in accordance with the temperature of the battery.

Japanese Patent Application Laid-Open No. HEI 4-351436 describes an art for changing the charging voltage of a battery in accordance with the temperature of the battery. More specifically, as the battery temperature becomes lower, a higher charging voltage is set to charge the battery.

However, care must be taken if among loads connected to a battery to be charged, there is a load, for example, a bulb or the like, which changes in characteristics, such as the length of service life, brightness, etc. if receiving an applied voltage higher than its rated voltage. That is, if the battery temperature is low, a high charging voltage is needed, so that a charging voltage exceeding the rated voltage of the load is applied to the load in some cases. As a result, the characteristics of the load connected to the battery deteriorate although the battery is efficiently charged.

SUMMARY OF THE INVENTION

Accordingly, it is an object of the invention to provide a power supply system capable of efficiently charging a battery and of curbing deteriorations in the characteristics of a load connected to the battery.

A power supply system according to one aspect of the invention includes a battery, a load and an electric circuit which includes the battery and the load. The system also includes a controller that is connected to an electric circuit, and that charges the battery by supplying a required voltage. The controller changes a voltage that is supplied to at least a portion of the electric circuit when the required voltage is higher than a rated voltage above which a characteristic of the load.

Therefore, efficiently charging a battery and curbing deteriorations in the characteristics of a load connected to the battery are possible.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
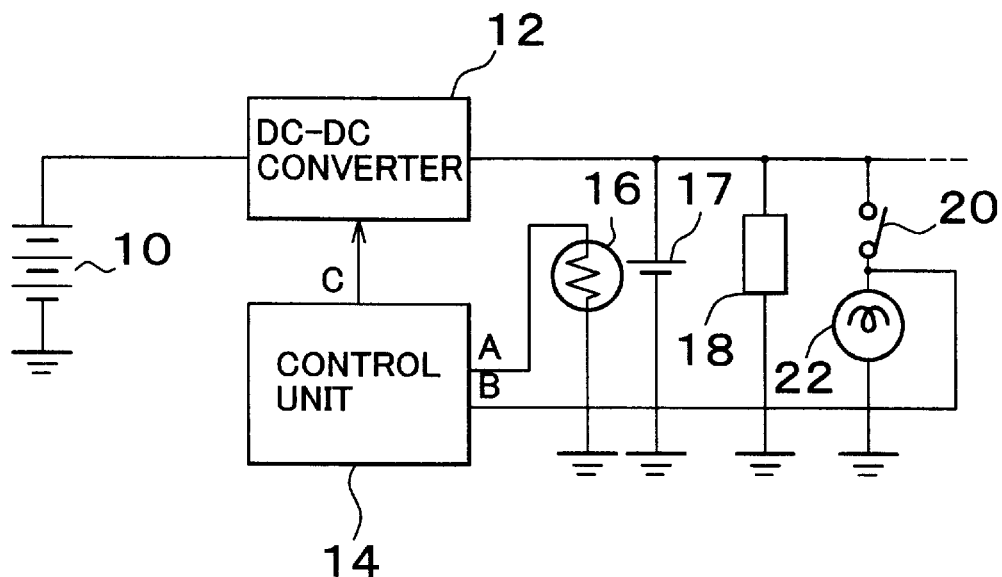
FIG. 1 is a diagram illustrating a circuit construction according to an embodiment of the invention.

FIG. 1 illustrates a circuit construction of a power supply system according to a preferred embodiment. A battery 10 (e.g., of 36 V) supplies power to another battery 17 (e.g., of 12 V) via a DC-DC converter 12 that converts voltage, thereby charging the battery 17. The battery 10 may also drive a motor generator (now shown) and the like. The battery 17 is connected to a load 18 and a bulb 22, and drives these elements. The battery 10 and the battery 17 can be installed in a trunk room or an engine room of a vehicle. The operation of the DC-DC converter 12 is controlled by a control unit 14. That is, the control unit 14 determines an ambient temperature of the battery 17, which is to be charged, based on a detection signal from a thermister 16. The control unit 14 controls the DC-DC converter 12 in such a manner that the charging voltage increases with decreases in the ambient temperature of the battery 17 so as to charge the battery 17 when necessary.

The bulb 22 connected to the battery 17 deteriorates in brightness and the length of service life if a voltage exceeding a rated voltage (e.g., 14 V) of the bulb 22 is applied thereto. When the bulb 22 is electrically connected to the circuit, that is, when a bulb operating switch 20 is on, the control unit 14 controls the DC-DC converter 12 so that a voltage exceeding the rated voltage is not applied to the bulb 22 during the charging of the battery 17. In this embodiment, the DC-DC converter 12 and the control unit 14 function as means for charging the battery 17.

The construction and the operation of the control unit 14 will be described in detail below. In the below description, an input terminal of the control unit 14 to which the ambient temperature of the battery 17 detected by the thermister 16 is inputted will be referred to as "terminal A", and an input terminal to which ON/OFF signals of a switch 20 (ON/OFF signals of the bulb 22) are inputted will be referred to as "terminal B", and a terminal from which a control signal is outputted to the DC-DC converter 12 will be referred to as "terminal C".

Figure 2:
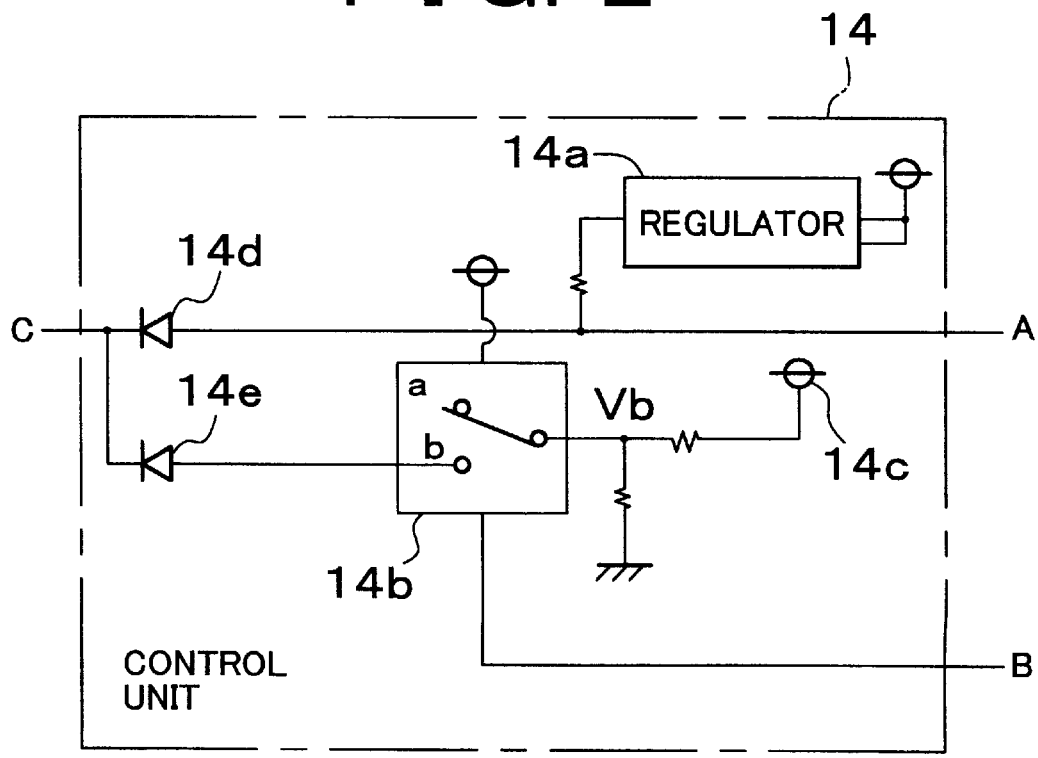
FIG. 2 is a diagram illustrating a circuit construction of a control unit shown in FIG. 1.

FIG. 2 illustrates a circuit construction of the control unit 14. The control unit 14 includes a regulator 14a, a switch 14b, a power supply 14c, and diodes 14d, 14e. The regulator 14a is connected to the terminal A, and restricts a voltage signal from the thermister 16 that corresponds to the temperature into a predetermined voltage range. The input signal to the terminal A restricted by the regulator 14a is outputted to the terminal C via the diode 14d.

Figure 3:
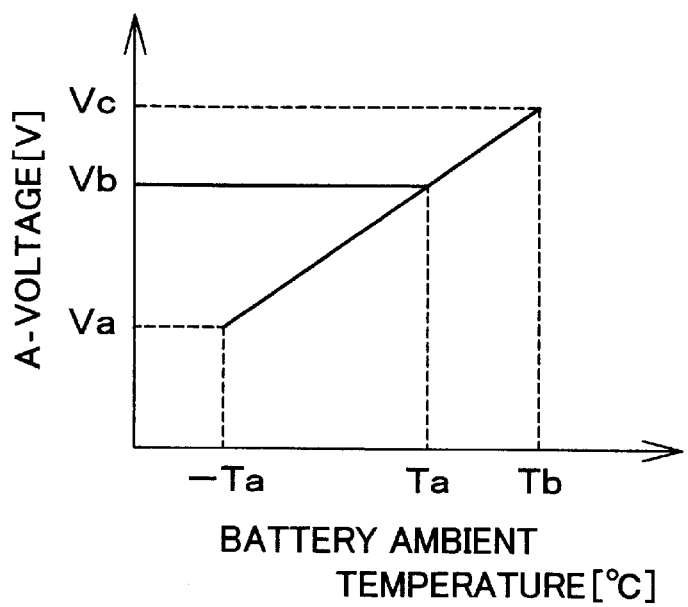
FIG. 3 is a graph showing a voltage characteristic of a terminal A shown in FIG. 2.

FIG. 3 indicates the input voltage of the terminal A restricted by the regulator 14a. In FIG. 3, the horizontal axis indicates the ambient temperature (° C.) of the battery 17 detected by the thermister 16, and the vertical axis indicates the voltage of the terminal A after restriction by the regulator 14a. As indicated in FIG. 3, if the battery ambient temperature changes as in −Ta, Ta, and Tb (Ta<Tb), the voltage is controlled so that the terminal A voltage monotonously increases as in Va, Vb, and then Vc (Va<Vb<Vc).

The switch 14b shown in FIG. 2 is a switch, such as a relay or the like, in which a contact is selected based on the ON/OFF signal of the bulb 22 inputted from the terminal B. More specifically, when the bulb 22 is off, an open contact a is selected. When the bulb 22 is on, a contact b is selected. The switch 14b is connected to the power supply 14c and voltage divider resistors, and is supplied with a constant voltage Vb. Therefore, when the contact a of the switch 14b is selected, the switch 14b outputs zero volt (0 V). When the contact b is selected, the switch 14b outputs the contact voltage Vb. The output of the switch 14b is connected to the terminal C via the diode 14e in parallel with the diode 14d.

In this construction, a control voltage is outputted to the terminal C as described below (TABLE 1), in accordance with the ON/OFF state of the bulb 22 and the ambient temperature of the battery 17, that is, the input voltage at the terminal A.

TABLE 1

| Bulb | Battery ambient temperature | Output voltage of terminal C |
|------|------------------------------|------------------------------|
| ON   | −Ta to Ta                    | Vb (constant)                |
| ON   | Ta to Tb                     | Vb to Vc                     |
| OFF  | −Ta to Ta                    | Va to Vb                     |
| OFF  | Ta to Tb                     | Vb to Vc                     |

That is, when the battery ambient temperature is within the range of −Ta to Ta and the bulb 22 is on, a voltage of Va to Vb restricted by the regulator 14a is outputted from the terminal A. Since the contact b is selected in the switch 14b corresponding to the on-state of the bulb 22, the switch 14b outputs a constant voltage Vb. Therefore, the constant voltage (Vb) is outputted from the terminal C regardless of the battery ambient temperature.

When the battery ambient temperature is within the range of Ta to Tb and the bulb 22 is on, a voltage of Vb to Vc restricted by the regulator 14a is outputted from the terminal A, and the switch 14b outputs the constant voltage Vb. Therefore, a voltage of Vb to Vc in accordance with the battery ambient temperature is outputted from the terminal C.

When the bulb 22 is off, the switch 14b is controlled to switch to the open contact a, so that the voltage from the terminal A restricted by the regulator 14a, that is, a voltage of Va to Vc in accordance with the battery ambient temperature, is outputted from the terminal C.

Thus, when the bulb 22 is off, a voltage signal corresponding to the ambient temperature of the battery 17 is outputted from the terminal C of the control unit 14. When the bulb 22 is on and the battery ambient temperature is relatively low (−Ta to Ta), a constant voltage signal is outputted from the terminal C. When the ambient temperature is relatively high (Ta to Tb), a voltage signal corresponding to the ambient temperature is outputted from the terminal C, and is supplied to the DC-DC converter 12. In accordance with the control voltage, the DC-DC converter 12 converts the DC voltage from the battery 10. The converted DC voltage is supplied to the load 18 and the bulb 22. When the control voltage is Vb (constant), the DC-DC converter 12 outputs a contact voltage (Ve) corresponding to the constant control voltage. When the control voltage varies within the range of Va to Vc, the DC-DC converter 12 outputs a voltage of Vf to Vd in inverse proportion to the control voltage, where Vd<Ve<Vf.

Figure 4:
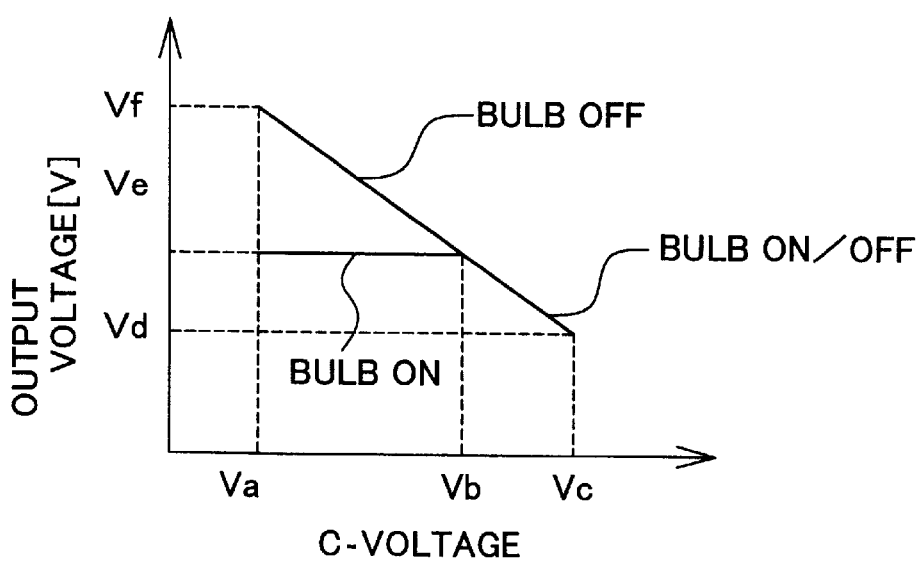
FIG. 4 is a graph showing an output-voltage characteristic of a DC-DC converter shown in FIG. 1.

FIG. 4 indicates a relationship between the control voltage from the control unit 14 (terminal C voltage) and the output voltage of the DC-DC converter 12. When the bulb 22 is off, the control unit 14 outputs a control voltage of Va to Vc. In response, the DC-DC converter 12 outputs a voltage of Vf to Vd in inverse proportion to the control voltage. More specifically, the output voltage of the DC-DC converter 12 monotonously decreases with increases in the control voltage from the control unit 14. That is, the output voltage of the DC-DC converter 12 increases with decreases in the ambient temperature of the thermister 16. In this manner, the battery 17 is efficiently charged. Since the bulb 22 is off, that is, not connected to the circuit, the characteristics of the bulb 22 do not deteriorate even if the charging voltage exceeds the rated voltage of the bulb 22 (e.g., 14 V).

When the bulb 22 is on, the constant control voltage (Vb) is outputted if the ambient temperature of the battery 17 is low (−Ta to Ta), and the DC-DC converter 12 charges the battery 17 by outputting a constant voltage at or near the rated voltage of the load (e.g., 14 V) to the battery 17 and the bulb 22. If the battery ambient temperature is within the range of Ta to Tb, a control voltage of Vb to Vc is outputted, so that the DC-DC converter 12 charges the battery 17 by outputting a voltage that gradually decreases from the maximum value of the rated voltage (e.g., 14 V) with increases in the control voltage. That is, if the bulb 22 is on and the ambient temperature of the battery 17 is low so that the optimal charging voltage for charging the battery 17 exceeds the rated voltage of the bulb 22, the charging voltage for the battery 17 is reduced to the rated voltage of the bulb 22, so that the battery 17 can be charged without degrading the characteristics of the bulb 22.

Although in this embodiment, the battery 17 is charged with the rated voltage of the bulb 22, for example, 14V, when the bulb 22 is on and the optimal charging voltage for the battery 17 exceeds the rated voltage of the bulb 22, it is also possible to charge the battery 17 with a voltage (e.g., 12 V) that is lower than the rated voltage of the bulb 22. Furthermore, instead of setting the charging voltage to the rated voltage over the entire range where the optimal charging voltage is higher than the rated voltage, it is also possible to set the charging voltage to the rated voltage only within the temperature range of 0° C. to Ta. Furthermore, when the charging voltage is basically set to the rated voltage (e.g., 14 V), the charging voltage may be temporarily raised at a predetermined timing.

Figure 5:
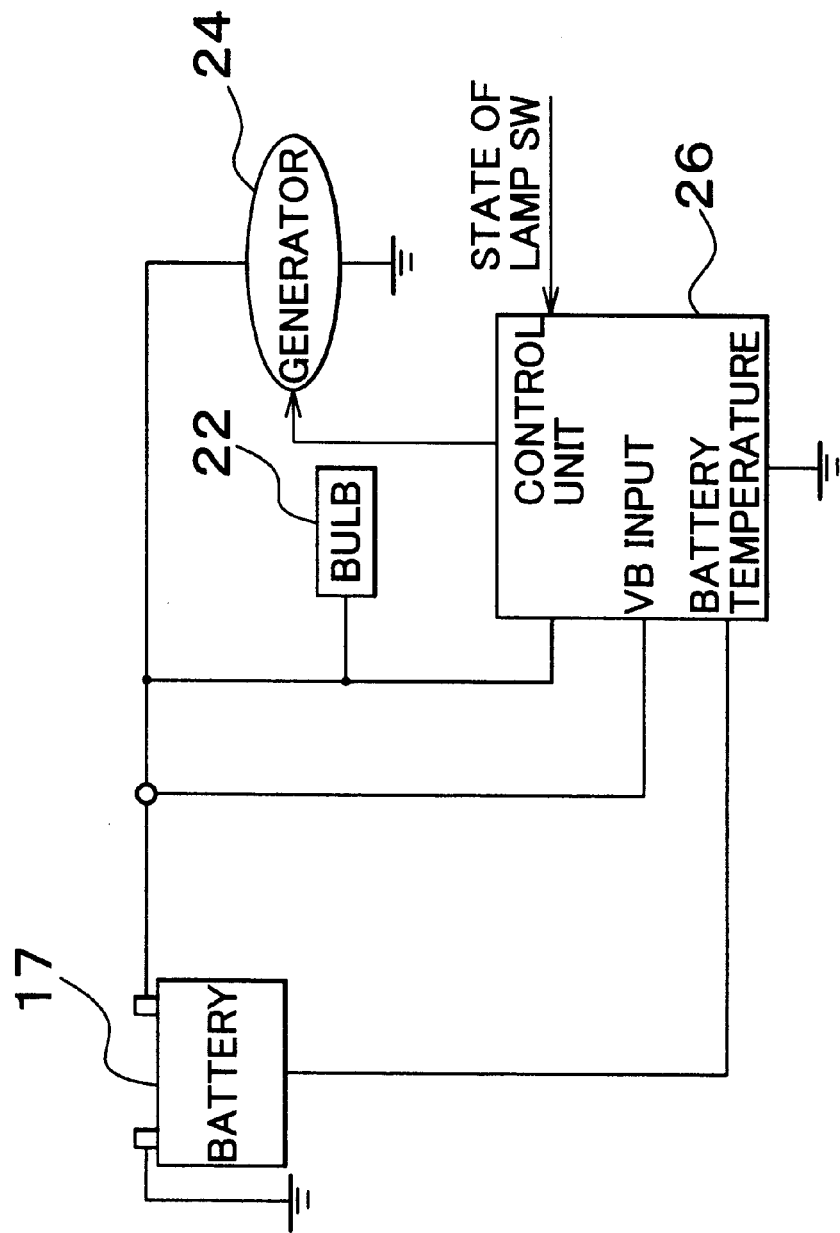
FIG. 5 is a diagram illustrating a circuit construction according to another embodiment.

FIG. 5 illustrates a circuit construction according to another embodiment. A battery 17 is connected to a bulb 22 and to a power generator 24 for charging the battery 17. The operation of the power generator 24 is controlled by a control unit 26. The control unit 26 is formed by a microcomputer. The control unit 26 inputs a battery temperature and a battery voltage VB, and drives the power generator 24 so as to charge the battery 17 with a charging voltage in accordance with the temperature of the battery 17. However, if the battery 17 is charged with a voltage that exceeds the rated voltage of the bulb 22, the characteristics of the bulb 22 deteriorate. Therefore, when the battery 17 is to be charged with a voltage exceeding the rated voltage of the bulb 22, the control unit 26 curbs the deteriorations in characteristics of the bulb 22 by limiting the duration of charging the battery 17 with such a high voltage to a certain duration, and reducing the charging voltage to the rated voltage of the bulb 22 for the rest of the charging duration. In this embodiment, the power generator 24 and the control unit 26 function as means for charging the battery 17.

Figure 6:
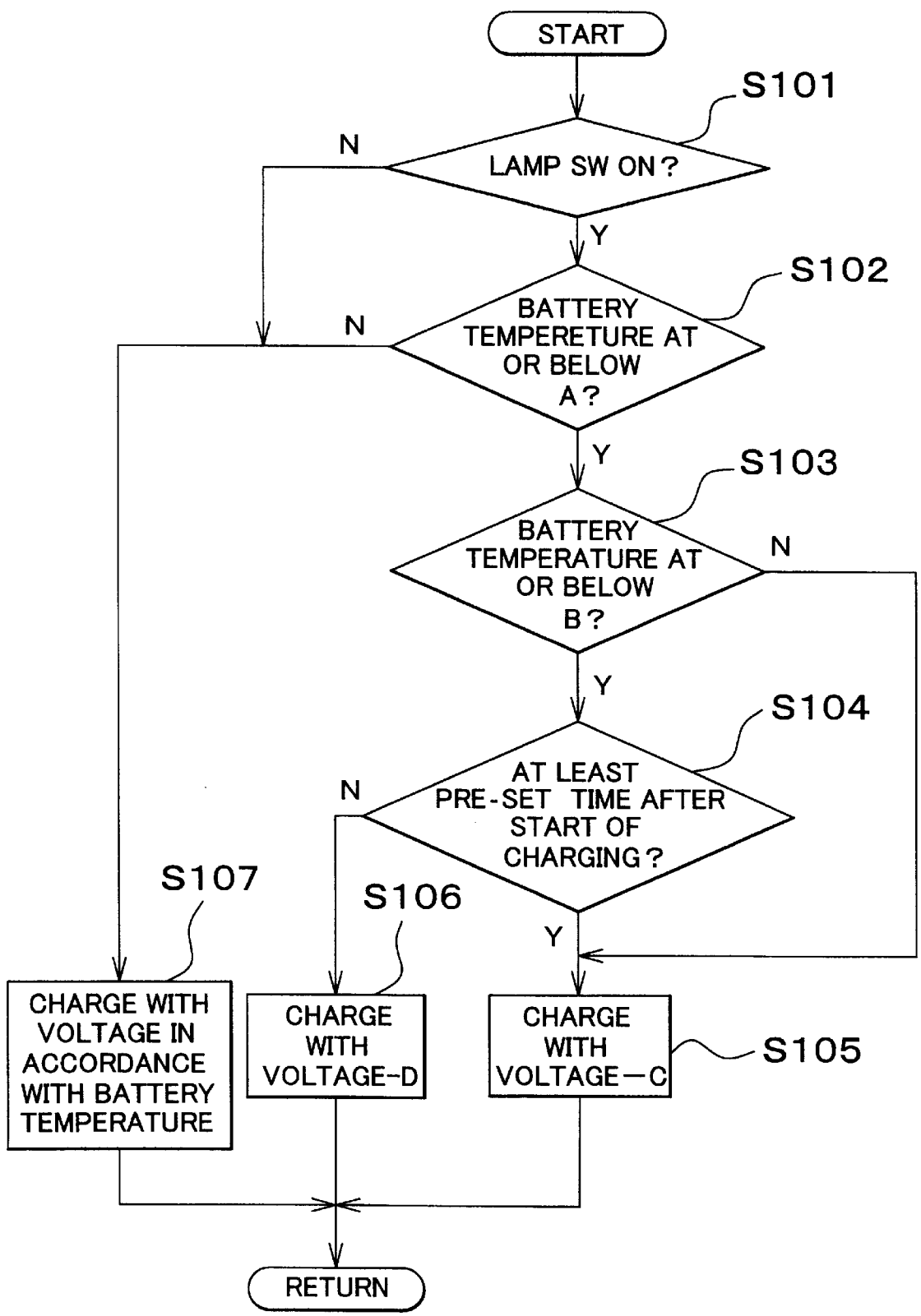
FIG. 6 is a flowchart of processing executed by a control unit shown in FIG. 5.

FIG. 6 shows a flowchart of processing executed by the control unit 26 in this embodiment. The control unit 26 first determines whether the lamp switch is on, that is, whether the bulb 22 is on (S101). If the bulb 22 is off, the control unit 26 controls the power generator 24 so as to charge the battery 17 with a voltage in accordance with the ambient temperature of the battery 17 (S107) since in that case, the charging of the battery 17 does not degrade the characteristics of the bulb 22. Conversely, if the bulb 22 is on, the control unit 26 determines whether the battery ambient temperature is at most a value A (S102). If the battery ambient temperature is at most A, the control unit 26 determines whether the battery temperature is at most B (A>B) (S103). If the battery ambient temperature lower than or equal to B, the control unit 26 determines whether a predetermined time has elapsed following the start of the charging (S104) because in that case the battery 17 needs to be charged with a voltage exceeding the rated voltage of the bulb 22. As is apparent from the above description, this determination is performed in order to limit the duration of applying a voltage exceeding the rated voltage to the predetermined duration. When the predetermined time has not elapsed following the start of charging, the control unit 26 controls the power generator 24 so as to charge the battery 17 with a charging voltage in accordance with the temperature of the battery 17, for example, a charging voltage D (S106). When the elapsed time from the start of charging exceeds the predetermined time, the control unit 26 controls the power generator 24 so as to reduce the charging voltage to a voltage C that is equal to or lower than the rated voltage (S105), thereby curbing the deteriorations in characteristics of the bulb 22. It is preferred that the aforementioned predetermined time be set in accordance with the degree of deterioration in characteristics of the load connected to the battery 17.

When the temperature of the battery 17 is higher than the value B, the control unit 26 sets the charging voltage to the value C equal to or lower than the rated voltage to charge the battery 17 even if the optimal charging voltage exceeds the rated voltage (S105). Therefore, when the battery temperature exceeds B before the predetermined time elapses following the start of charging, the charging voltage is changed from D to C. Furthermore, if the battery temperature is higher than A, the control unit 26 controls the power generator 24 so as to charge the battery 17 with a voltage in accordance with the battery temperature (S107) since the voltage needed to charge the battery 17 is lower than or equal to the rated voltage of the bulb 22.

Figure 7A:
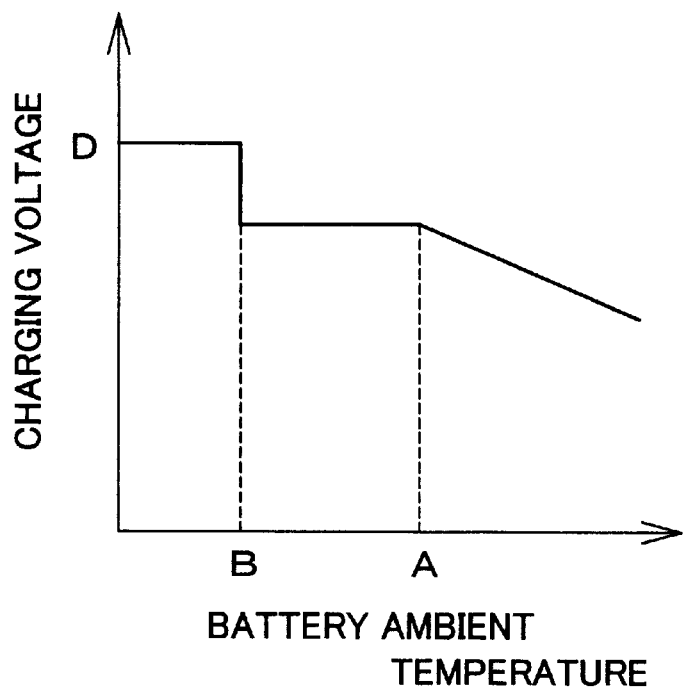
FIGS. 7A and 7B are graphs indicating a relationship between the charging voltage and the battery ambient temperature, and a relationship between the charging voltage and time.
Figure 7B:
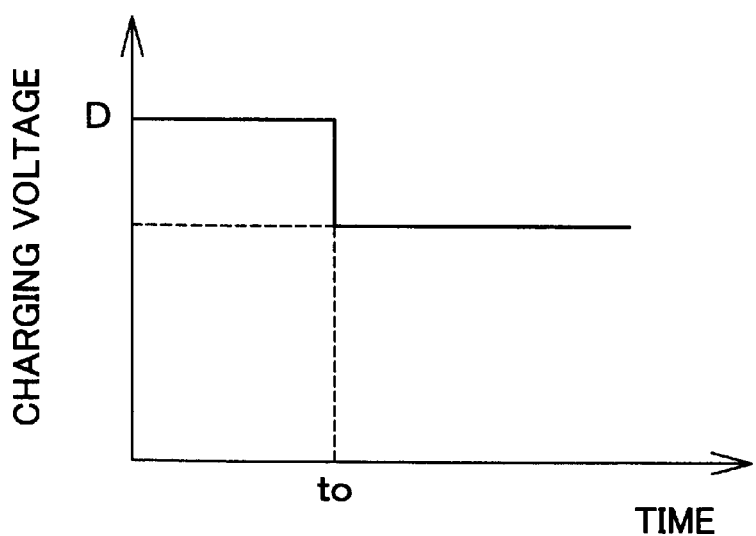

FIG. 7A indicates a relationship between the battery ambient temperature and the charging voltage. FIG. 7B indicates a relationship between the charging voltage and the elapsed time, respectively. When the battery temperature is relatively low (at most temperature-A), it would be desirable to charge the battery 17 with a voltage exceeding the rated voltage. However, taking deteriorations in characteristics of the bulb 22 into consideration, the battery 17 is activated by charging it with the D-voltage higher than the rated voltage and with the C-voltage equal to or lower than the rated voltage. The duration during which the battery 17 is charged by applying thereto the D-voltage higher than the rated voltage is limited to a certain time (time t0 in the graph). After that, the battery 17 is charged with the C voltage equal to or lower than the rated voltage. Therefore, it becomes possible to curb deteriorations in characteristics of the bulb 22 while efficiently charging the battery 17.

In accordance with the embodiment, instead of setting the D-voltage higher than the rated voltage to a constant value, it is also possible to vary the D-voltage in accordance with the ambient temperature of the battery 17. Furthermore, it is also possible to omit the use of the temperature thresholds A, B, and simply vary the charging voltage in accordance with the battery ambient temperature, and set the duration of applying the D-voltage higher than the rated voltage to a constant duration and, after that, charge the battery 17 with the C-voltage equal to or lower than the rated voltage (the value C may be varied in accordance with the battery temperature).

Figure 8:
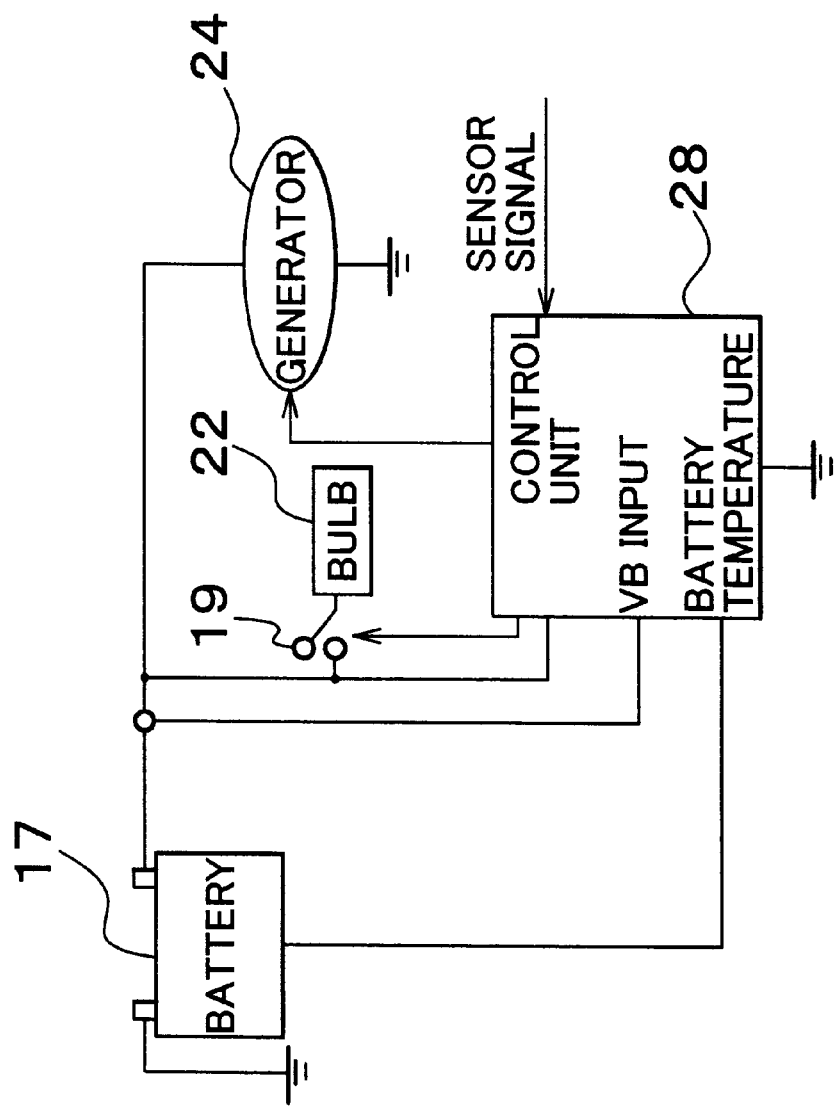
FIG. 8 is a diagram illustrating a circuit construction according to still another embodiment.

FIG. 8 illustrates a circuit construction according to still another embodiment. The construction shown in FIG. 8 differs from the construction shown in FIG. 5 in that a switch 19 is provided for connecting a bulb 22 to the circuit, and in that a control unit 28 controls the switching of the switch 19 to disconnect the bulb 22 to and connect it to the circuit based on the battery temperature and various sensor signals. The various sensor signals are signals that are needed to determine whether it is necessary to operate the bulb 22. The sensor signals may be, for example, a detection signal indicating whether the vehicle is running, a detection signal indicating whether the outside world is light or dark.

Figure 9:
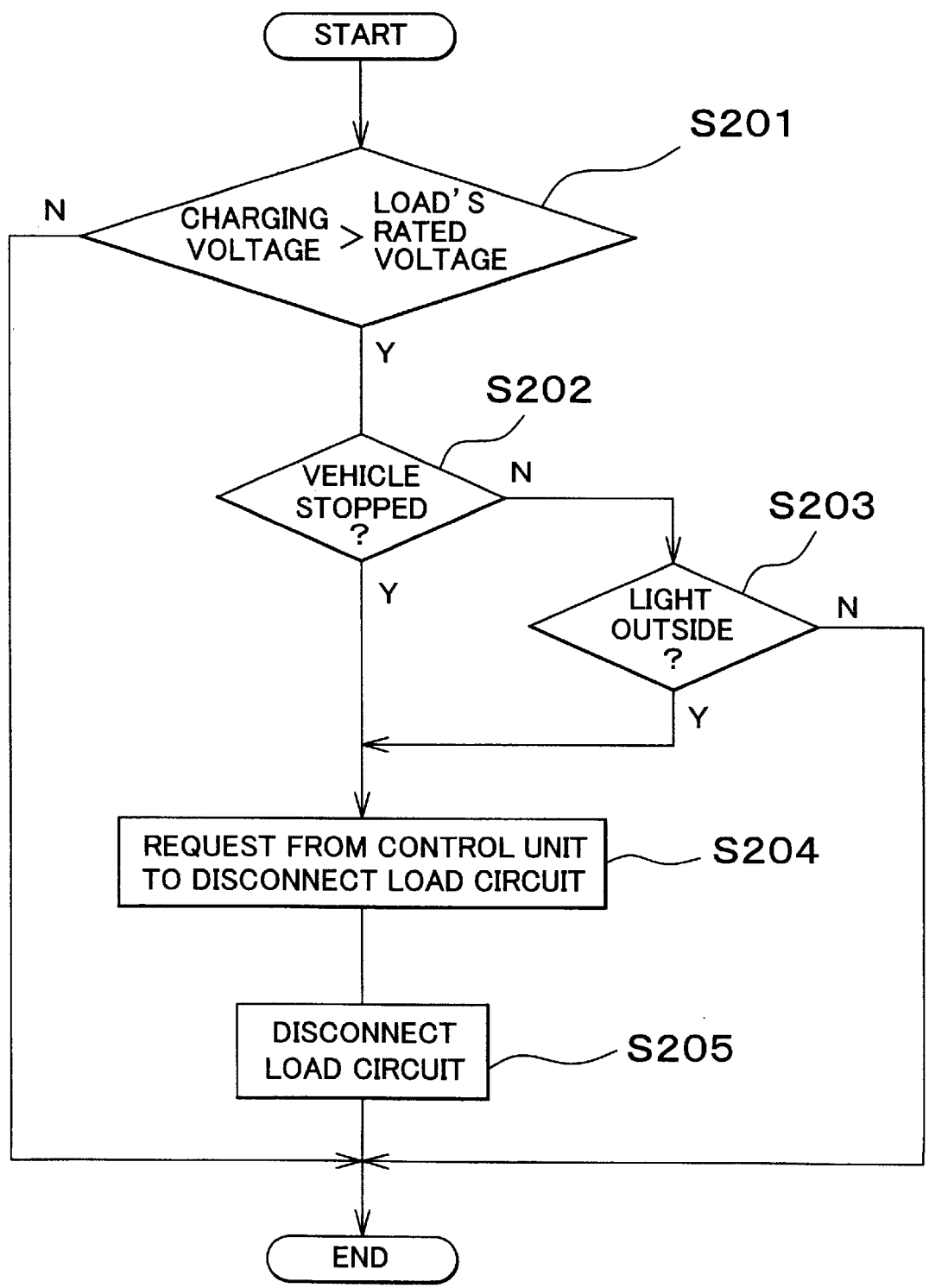
FIG. 9 is a flowchart of processing executed by a control unit shown in FIG. 8.

FIG. 9 shows a flowchart of processing executed by the control unit 28 in this embodiment. First, the control unit 28 determines whether the charging voltage determined in accordance with the temperature of the battery 17 is higher than the rated voltage of the bulb 22 (S201). If the temperature of the battery 17 is low so that the charging voltage exceeds the rated voltage, the control unit 28 determines whether the operation of the bulb 22 is needed based on various sensor signals. That is, the control unit 28 determines whether the vehicle is at a stop (S202). If the vehicle is running, the control unit 28 determines whether the outside is light (S203). When the vehicle is at a stop or when the outside is light, the control unit 28 opens the switch 19 since there is no need to operate the bulb 22 (S204, S205). As a result, the bulb 22 is disconnected from the circuit, so that even though the battery 17 is charged with a charging voltage from the power generator 24 that is higher than the rated voltage, the bulb 22 is not affected while the battery 17 is efficiently charged. When the vehicle is running and the outside is dark, it is preferable to prevent deteriorations in characteristics of the bulb 22 by varying the charging voltage by, for example, a method described above, because the bulb 22 cannot be disconnected in that case.

Figure 10:
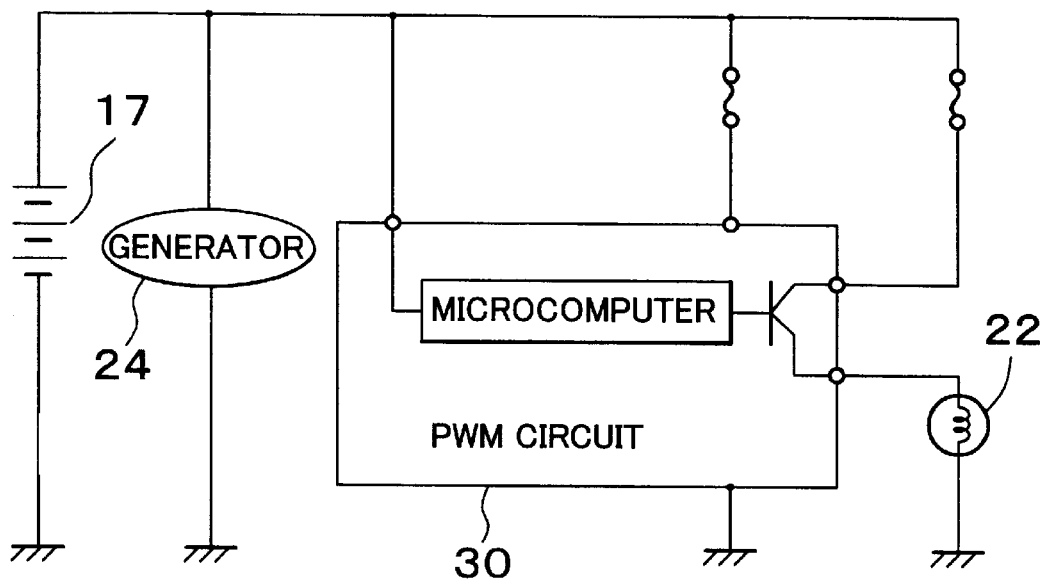
FIG. 10 is a diagram illustrating a circuit construction according to a further embodiment.

FIG. 10 shows a circuit construction according to a further embodiment. This circuit construction is similar to the constructions in the foregoing embodiments in that a bulb 22, that is, a load, is connected to a battery 17, and in that the battery 17 is connected so as to be charged by a power generator 24. In this embodiment, however, a PWM (pulse width modulation) circuit 30 that includes a microcomputer and a modulation transistor is provided as means for reducing the voltage applied to the load, between the bulb 22 and the power generator 24. The charging voltage from the power generator 24 is modulated in pulse width by the PWM circuit 30 before being supplied to the bulb 22. When the voltage from the power generator 24 is lower than or equal to the rated voltage of the bulb 22, the PWM circuit 30 does not modulate the charging voltage. When the voltage from the power generator 24 is higher than the rated voltage, the PWM circuit 30 modulates the charging voltage in pulse width so that the effective voltage is reduced to or below the rated voltage, before supplying the voltage to the bulb 22.

Figure 11:
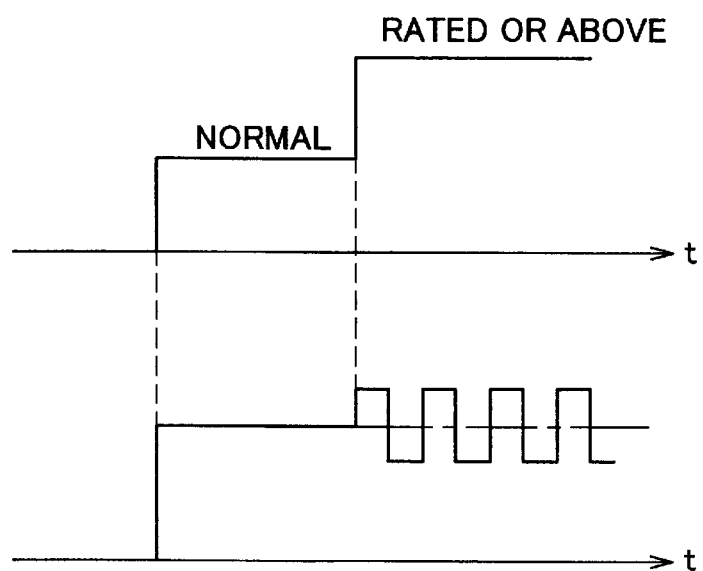
FIG. 11 is a timing chart of pulse witch modulation performed by a circuit shown in FIG. 10.

FIG. 11 is a timing chart of pulse width modulation performed by the PWM circuit 30. In the chart, VA (upper stage) indicates the output from the power generator 24, and VB (lower stage) indicates the voltage supplied to the bulb 22. The power generator 24 charges the battery 17 by outputting a voltage in accordance with the ambient temperature of the battery 17. When the ambient temperature of the battery 17 is relatively high so that a normal voltage, that is, a voltage lower than or equal to the rated voltage of the bulb 22, is used to charge the battery 17, the voltage from the power generator 24 is not modulated, but is simply supplied to the bulb 22. When the ambient temperature of the battery 17 is relatively low so that the power generator 24 outputs a voltage higher than the rated voltage of the bulb 22, the PWM circuit 30 modulates the voltage from the power generator 24 in pulse width at a predetermined duty ratio, before supplying the voltage to the bulb 22. The pulse width modulation is set so that the effective voltage becomes as indicated by a one-dot chain line in the chart, that is, becomes equal to or lower than the rated voltage of the bulb 22. As a result, it becomes possible to supply a voltage equal to or lower than the rated voltage to the bulb 22 while charging the battery 17 with a voltage higher than the rated voltage. Thus, deteriorations in characteristics of the bulb 22 can be prevented.

Although in this embodiment, the voltage supplied to the bulb 22 is reduced through pulse width modulation, it is also possible to provide a DC-DC converter between the power generator 24 and the bulb 22 and use the DC-DC converter to reduce the voltage to be supplied to the bulb 22 to or below the rated voltage of the bulb 22.

While the embodiments of the invention have been described above in conjunction with a bulb (lamp) provided as a load that deteriorates in characteristics if a voltage higher than the rated voltage of the load is applied thereto, the invention is not restricted by the foregoing embodiments, but is applicable to any load. In the construction shown in FIG. 5, it is preferable to change the duration of applying the charging voltage D in accordance with the kind of the load concerned. In the construction shown in FIG. 8, it is preferable to determine whether the operation of the load concerned is needed, in accordance with the kind of the load.

As is apparent from the foregoing description, the invention makes it possible to curb deteriorations in characteristics of a load connected to a battery while efficiently charging the battery.

While the invention has been described with reference to what are presently considered to be preferred embodiments thereof, it is to be understood that the invention is not limited to the disclosed embodiments or constructions. On the contrary, the invention is intended to cover various modifications and equivalent arrangements.

What is claimed is:

1. A power supply system comprising:

a battery;

a load;

an electric circuit including the battery and the load; and a controller that is connected to the electric circuit which charges the battery by supplying a required voltage, wherein the controller changes a voltage that is supplied to at least a portion of the electric circuit when the required voltage is higher than a rated voltage above which a characteristic of the load deteriorates, and wherein the controller detects an operation requirement for the load, and electrically isolates the load from the electric circuit based on the operation requirement for the load when the required voltage is higher than the rated voltage.

2. A power supply system according to claim 1, wherein the required voltage is determined based on a temperature of the battery.

3. A power supply system, comprising:

a battery;

a load;

an electric circuit including the battery and the load; and a controller that is connected to the electric circuit which charges the battery by supplying a required voltage, wherein the controller changes a voltage that is supplied to at least a portion of the electric circuit when the required voltage is higher than a rated voltage above which a characteristic of the load deteriorates, and wherein the controller controls a voltage that is supplied to the battery to the required voltage and reduces a voltage that is supplied to the load to be equal to the rated voltage or less when the required voltage is higher than the rated voltage.

4. A power supply system according to claim 3, wherein the required voltage is determined based on a temperature of the battery.

5. A power supply system comprising:

a battery;

a load;

an electric circuit including the battery and the load;

a detector that detects an operation state of the load; and a controller that is connected to the electric circuit which charges the battery by supplying a required voltage, wherein a voltage applied to the battery for charging is controlled to the required voltage when the detector detects that the load is not operating, and the voltage applied to the battery for charging is controlled to a rated voltage or lower when the detector detects that the load is operating, and wherein the requirement voltage is determined based on a temperature of the battery.

6. A control method. for power supply system which includes a battery, a load, an electric circuit including the battery and the load, and a controller that is connected to the electric circuit which charges the battery by supplying a required voltage, the method comprising the steps of:

changing a voltage that is supplied to at least a portion of the electric circuit when the required voltage is higher than a rated voltage above which a characteristic of the load deteriorates; and detecting an operation requirement for the load, and electrically isolates the load from the electric circuit based on the operation requirement for the load when the required voltage is higher than the rated voltages.

7. A power supply method according to claim 6, wherein the required voltage is determined based on a temperature of the battery.

8. A control method for power supply system which includes a battery, a load, an electric circuit including the battery and the load, and a controller that is connected to the electric circuit which charges the battery by supplying a required voltage, the method comprising the steps of:

changing a voltage that is supplied to at least a portion of the electric circuit when the required voltage is higher than a rated voltage above which a characteristic of the load deteriorates; and controlling a voltage that is supplied to the battery to the required voltage and reduces a voltage that is supplied to the load to equal to the rated voltage or less when the required voltage is higher than the rated voltage.

9. A power supply-system according to claim 8, wherein the required voltage is determined based on a temperature of the battery.

10. A control method for power supply system which includes a battery, a load, an electric circuit including the battery and the load, a detector that detects an operation state of the. load, and a controller connected to the electric circuit which charges the battery by supplying a required voltage, the method comprising the steps of:

controlling a voltage applied to the battery: for charging to the required voltage when the detector detects that the load is not operating;

controlling the voltage applied to the battery for charging to a rated voltage or lower when the detector detects that the load is operating; and determining the required voltage based on a temperature of the battery.

* * * * *